United States Patent
Venkiteswaran et al.

(10) Patent No.: US 10,334,030 B2
(45) Date of Patent: Jun. 25, 2019

(54) LOAD BALANCING BETWEEN COMPUTING CLOUDS

(71) Applicant: A10 Networks, Inc., San Jose, CA (US)

(72) Inventors: Manikantan Venkiteswaran, Bangalore (IN); Manu Dilip Shah, Bangalore (IN)

(73) Assignee: A10 Networks, Inc., San Jose, CA (US)

( * ) Notice: Subject to any disclaimer, the term of this patent is extended or adjusted under 35 U.S.C. 154(b) by 238 days.

(21) Appl. No.: 15/476,572

(22) Filed: Mar. 31, 2017

(65) Prior Publication Data

US 2018/0288138 A1 Oct. 4, 2018

(51) Int. Cl.
*H04L 29/08* (2006.01)
*H04L 12/813* (2013.01)

(52) U.S. Cl.
CPC .......... *H04L 67/1002* (2013.01); *H04L 47/20* (2013.01)

(58) Field of Classification Search
CPC ............................ H04L 67/1002; H04L 47/20
See application file for complete search history.

(56) References Cited

U.S. PATENT DOCUMENTS

| | | | |
|---|---|---|---|
| 2015/0012864 A1* | 1/2015 | Goodwin | G06F 9/45558 715/771 |
| 2017/0006092 A1* | 1/2017 | Rochwerger | H04L 67/1002 |
| 2018/0262496 A1* | 9/2018 | Namboodiri | H04L 67/327 |
| 2018/0288091 A1* | 10/2018 | Doron | H04L 63/1458 |

\* cited by examiner

*Primary Examiner* — Michael A Keller
(74) *Attorney, Agent, or Firm* — Keith Kline; The Kline Law Firm PC

(57) ABSTRACT

Data traffic splitting between computing clouds may include a first application delivery controller (ADC) and a second ADC. The first ADC can be configured to control data traffic split within a first computing cloud. The second ADC can be configured to control data traffic split within a second computing cloud. The system may include a third ADC configured to control traffic split between at least the first ADC and the second ADC. The first ADC can be associated with a first version of an application configured to run on the first computing cloud. The second ADC can be associated with a second version of the application configured to run on the second computing cloud. The third ADC is further configured to control data traffic split based on at least one blue/green policy.

18 Claims, 5 Drawing Sheets

LOAD BALANCING BETWEEN COMPUTING CLOUDS

TECHNICAL FIELD

This present disclosure relates generally to data networks and more particularly to systems and methods for performing data traffic split between computing clouds.

BACKGROUND

There is a growing number of cloud based applications that can be provided to subscribers via web and mobile services. Examples of cloud based applications include, but are not limited to, navigational services, audio and video applications, internet based television, and so forth. There are a number of computing cloud providers. Some computing cloud services provide software based load balancers to manage traffic splits and obtain analytics information concerning performance of applications. Some software based load balancers support blue/green deployment of applications (traffic split services) within the same computing cloud.

However, customers may need mechanisms for selecting computing cloud infrastructure for their applications based on price, performance, availability, and so forth. Existing software load balancers can be configured to provide data traffic split and performance analytics only within a single computing cloud. Thus, there is a need for technology of load balancing and performance analytics services between computing clouds provided by different cloud providers.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for data traffic split between computing clouds. According to one approach of the present disclosure, a system for performing data traffic split across computing clouds is provided. Specifically, the system may include at least a first application delivery controller (ADC) and a second ADC. The first ADC is configured to control data traffic split within a first computing cloud. The second ADC is configured to control data traffic split within a second computing cloud. The system may include a third ADC configured to control data traffic split between at least the first ADC and the second ADC.

In some embodiments, the third ADC can be further configured to control data traffic split based on at least one blue/green policy.

In some embodiments, the third ADC is further configured to control data traffic split based on at least one traffic split policy.

In some embodiments, the first ADC can be associated with a first version of an application configured to run on the first computing cloud. The second ADC can be associated with a second version of the application configured to run on the second computing cloud.

In some embodiments, the first computing cloud can be provided by a first provider. The second computing cloud can be provided by a second provider. The first provider can differ from the second provider. In certain embodiments, at least one of the first computing cloud or the second computing cloud may include one of Google Cloud Platform, Amazon Web Service, and Microsoft Azure.

In some embodiments, the first ADC can be running on the first computing cloud and the second ADC can be running on the second computing cloud.

In some embodiments, the third ADC can be launched in response to determining that the first ADC is running and the second ADC is running.

In certain embodiments, the third ADC can be running on one of the first computing cloud or the second computing cloud.

In some embodiments, the system may include an application delivery system configured to provide a user interface to configure the third ADC.

According to another approach of the present disclosure, a method for performing data traffic split across computing clouds is provided. The method may commence with providing a first ADC. The first ADC can be configured to control data traffic split within a first computing cloud. The method may include providing a second ADC. The second ADC can be configured to control data traffic split within a second computing cloud. The method may further include providing a third ADC configured to control data traffic split between at least the first ADC and the second ADC.

The method may include associating the first ADC with a first version of an application configured to run on the first computing cloud. The method may allow associating the second ADC with a second version of the application configured to run on the second computing cloud. The method may further include configuring the third ADC based on at least one blue/green policy to control data traffic split between at least the first ADC and the second ADC.

In further example embodiments of the present disclosure, the method operations are stored on a machine-readable medium comprising instructions, which, when implemented by one or more processors, perform the recited operations. In yet further example embodiments, hardware systems or devices can be adapted to perform the recited operations. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, a tablet computer, and a laptop computer), a game console, a handheld gaming device, a cellular phone, a smart phone, a smart television system, and so forth.

The embodiments of the present disclosure are directed to technology of data traffic split between computing clouds provided by different cloud providers. Some embodiments may provide systems and methods for blue/green deployment of applications across computing clouds. An example system for providing data traffic split across computing clouds may include a first ADC and a second ADC. The first ADC can be configured to provide load balancing within a first computing cloud. The second ADC can be configured to provide load balancing within a second computing cloud. The first computing cloud and the second computing cloud can be provided by different cloud providers. The example system may further include a third ADC configured to provide load balance between the first ADC and the second ADC.

Figure 1:
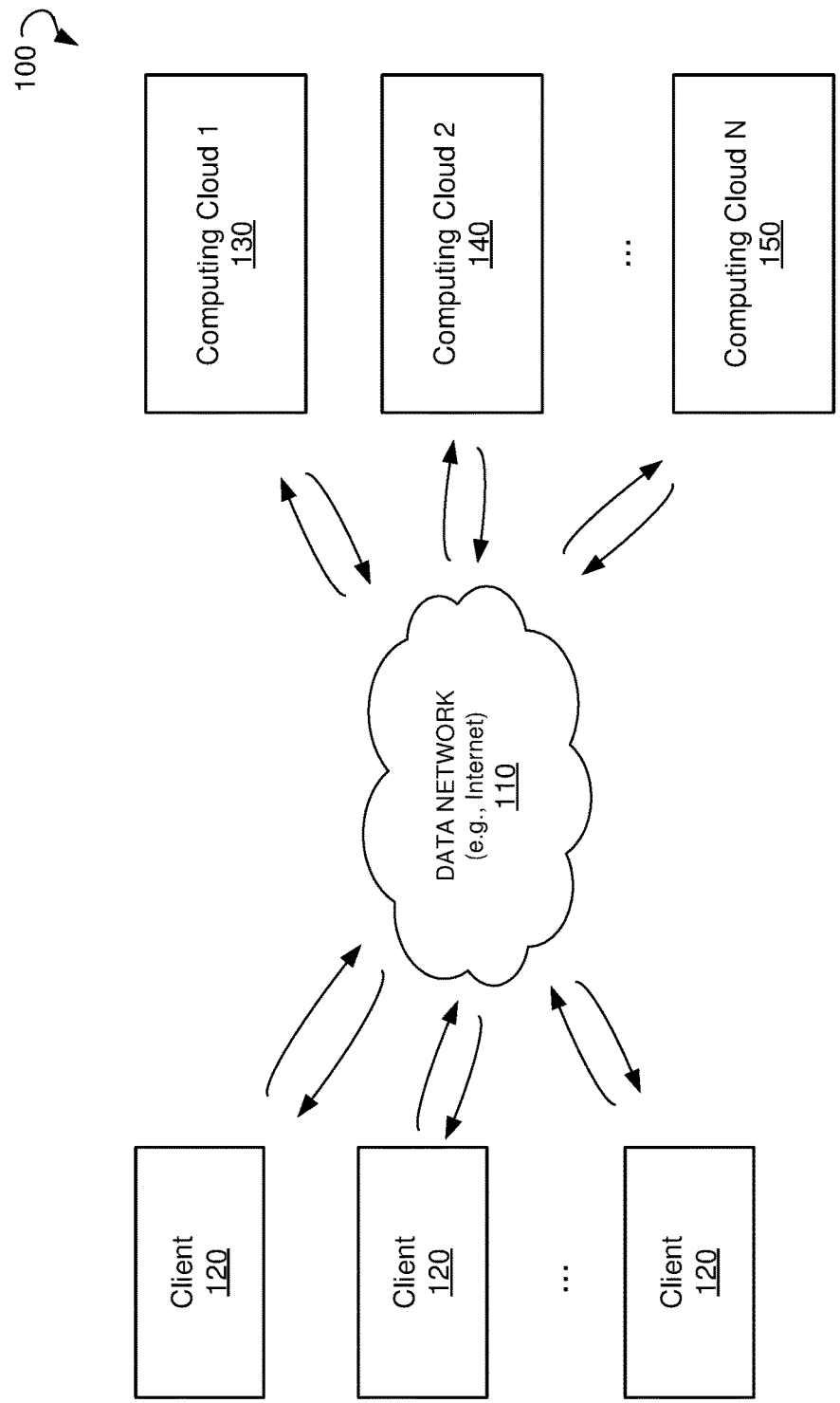
FIG. 1 is a block diagram showing an example environment, within which methods and systems for performing data traffic split between computing clouds can be implemented.

Referring now to the drawings, FIG. 1 illustrates an environment 100 within which methods and systems for performing data traffic split between computing clouds can be implemented. The environment 100 may include a data network 110, one or more clients 120, and computing clouds 130, 140, and 150. The data network 110 can be configured to communicatively connect the clients 120 and the computing clouds 130, 140, and 150.

The clients 120 may include a personal computer (PC), a laptop, a smartphone, a tablet PC, a television set, a mobile phone, an Internet phone, a netbook, a home gateway, a broadband gateway, a network appliance, a set top box, a media server, a personal media player, an access gateway, a networking switch, a server computer, a network storage computer, and so forth. When using the services, a user may use the client 120 to send data traffic to computing clouds 130, 140, and 150 over the data network 110.

The data network 110 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking. The data network 110 may include a network of data processing nodes, also referred to as network nodes that may be interconnected for the purpose of data communication.

The computing clouds 130, 140, and 150 can include computing resources (hardware and software) available at a remote location and accessible over the data network 110. The computing clouds can be shared by multiple users and can be dynamically re-allocated based on demand. The computing clouds 130, 140, and 150 may include one or more server farms/clusters including a collection of computer servers which can be co-located with network switches and/or routers. The clients 120 can be configured to send data to computing clouds 130, 140, and 150, request computational operations to be performed in the computing clouds 130, 140, and 150, and receive the results of the computational operations.

In some embodiments, the computing clouds 130, 140, and 150 may include application servers configured to receive and handle data (for example, user requests) from clients 120. In various embodiments of the present disclosure, the computing clouds 130, 140, and 150 may be provided by different computing cloud providers, such but not limited to Microsoft Azure, Google Cloud Platform (GCP), and Amazon Web Services (AWS). In certain embodiments, the computing clouds 130, 140, and 150 may include at least one ADC. The ADC may include a proxy server or a proxy application configured to direct data traffic to the one or more application servers.

In some embodiments, the ADC may include a software based load balancer. Some embodiments may provide an application delivery system (ADS) configured to launch and manage one or more ADCs. In certain embodiments, a customer application running on a computed cloud can be represented in ADS by an application entity. The application entity may include Hypertext Transfer Protocol (HTTP) domain information, flow of Uniform Resource Locators (URLs), traffic split policies, blue/green deployment policies, and so forth. In some embodiments, a user may launch, using ADS, a set of ADCs (also referred as a cluster) in the same computing cloud. ADS may generate a canonical name (CNAME) for the set of ADCs.

In some embodiments, the user may specify a computing cloud to launch the cluster. The user may create an application entity in ADS. The user may modify the application entity to indicate the application servers, traffic management policy, security policies, and so forth. Further, the user may associate the application entity with the cluster. ADS may create an A record containing the Internet Protocol (IP) information of ADCs. ADS may further modify the CNAME of the customer application with the CNAME created by ADS. As result, data traffic destined to application servers may flow through ADCs.

Figure 2:
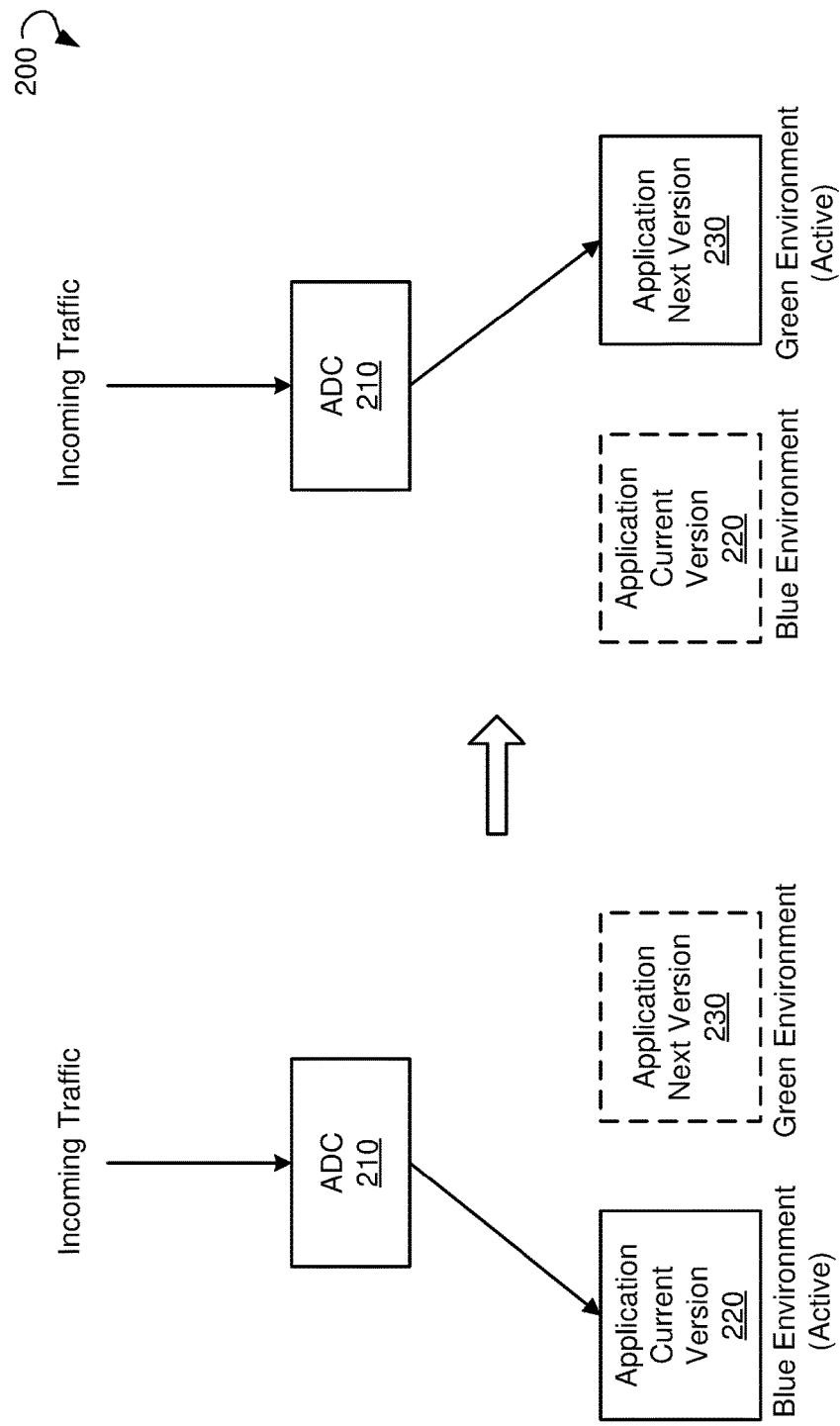
FIG. 2 is a block diagram showing functionality of an application delivery controller, according to some example embodiments.

FIG. 2 is a block diagram illustrating an example functionality of an example ADC 210. In some embodiments, the ADC 210 can be configured to split data traffic between two environments (called a blue environment and a green environment) that run two different versions of a customer application. Usually, the blue environment represents the current version 220 of the customer application, while the green environment represents a next version 230 of the customer application. ADC 210 can be configured to direct traffic to the current version 220 (in the blue environment) while the next version 230 (in the green environment) is under test and development. Once the next version 230 of the customer application (in the green environment) is tested and ready, ADC 210 can be configured to shift all or part of the data traffic to the next version 230 of the customer application, so deploying the green environment. The previously deployed current version 220 of the customer application can be kept non-active but accessible. If the newly deployed next version 230 suffers any issues, ADC 210 can be configured to redirect traffic back to the previously deployed current version 220.

According to some embodiments of the present disclosure, ADS can be used to launch a set of ADCs and use the set of the ADCs to control data traffic between two or more versions of a customer application located on different computing clouds provided by different cloud providers.

Figure 3:
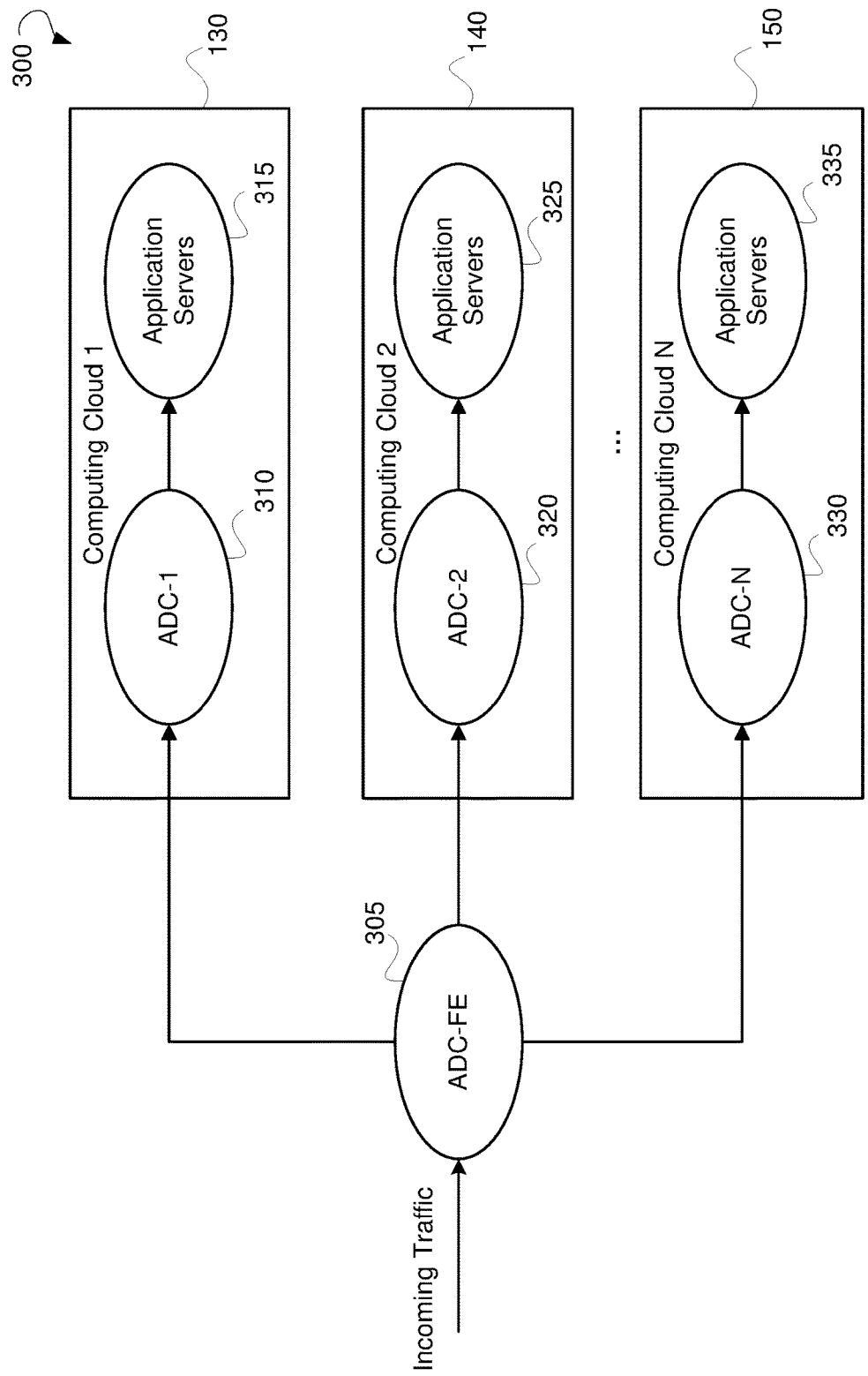
FIG. 3 is a block diagram illustrating various modules of a system for performing data traffic split across computing clouds, according to some example embodiments.

FIG. 3 is a block diagram illustrating an example system 300 for performing data traffic split between computing clouds, according to an example embodiment. The system 300 may include a front-end ADC 305 (ADC-FE), ADC 310 (ADC-1), ADC 320 (ADC-2), and ADC 330 (ADC-N). ADC-1 can be configured to control data traffic split between application servers 315 of computing cloud 130. ADC-2 can be configured to control data traffic split between application servers 325 of computing cloud 140. ADC-N can be configured to control data traffic split between application servers 335 of computing cloud 150. ADC-FE can be configured to control data traffic split between ADC-1, ADC-2, and ADC-N. As a result, ADC-FE can be configured to control traffic split between different computing clouds. In certain example embodiments, computing cloud 130 may include an AWS cloud, computing cloud 140 may include a GCP cloud, and computing cloud 150 may include a Microsoft Azure cloud.

In some embodiments, a user may launch clusters of ADCs in at least two computing clouds (for example, computing cloud 130 and computing cloud 140). For example, ADC-1 can be running on computing cloud 130 and ADC-2 can be running on computing cloud 140. The user may further create an application entity in ADS. The user may attach the application entity to both ADC-1 and ADC-2. The application entity may include a traffic split policy, a blue/green policy, and so forth. The traffic split policy may specify the traffic split between ADC-1 running on the computing cloud 130 and ADC-2 running on the computing cloud 140. In response to creating the application entity, ADS may further launch front end ADC cluster (ADC-FE). ADC-FE may provide load balancing between ADC-1 and ADC-2. In various embodiments, ADC-FE can be running on one of the computing clouds 130, 140, and 150, or a further computing cloud or a server.

In some example embodiments, ADC-FE may be configured to provide blue-green traffic split between versions of a customer application running on different computing clouds (for example, between computing cloud 130 and computing cloud 140). For example, a current version of a customer application can be running in computing cloud 130 in a blue environment, while the next version of the customer application can be tested in the computing cloud 140 in a green environment. ADC-FE may be configured to redirect traffic between the computing cloud 130 and computing cloud 140 to deploy either the current version or the next version of the customer application.

In further embodiments, ADS may include a module to analyze performance of versions of the customer application in computing clouds provided by different cloud providers. Based on the performance analytics and customer requirements, a user may choose a computing cloud infrastructure.

Figure 4:
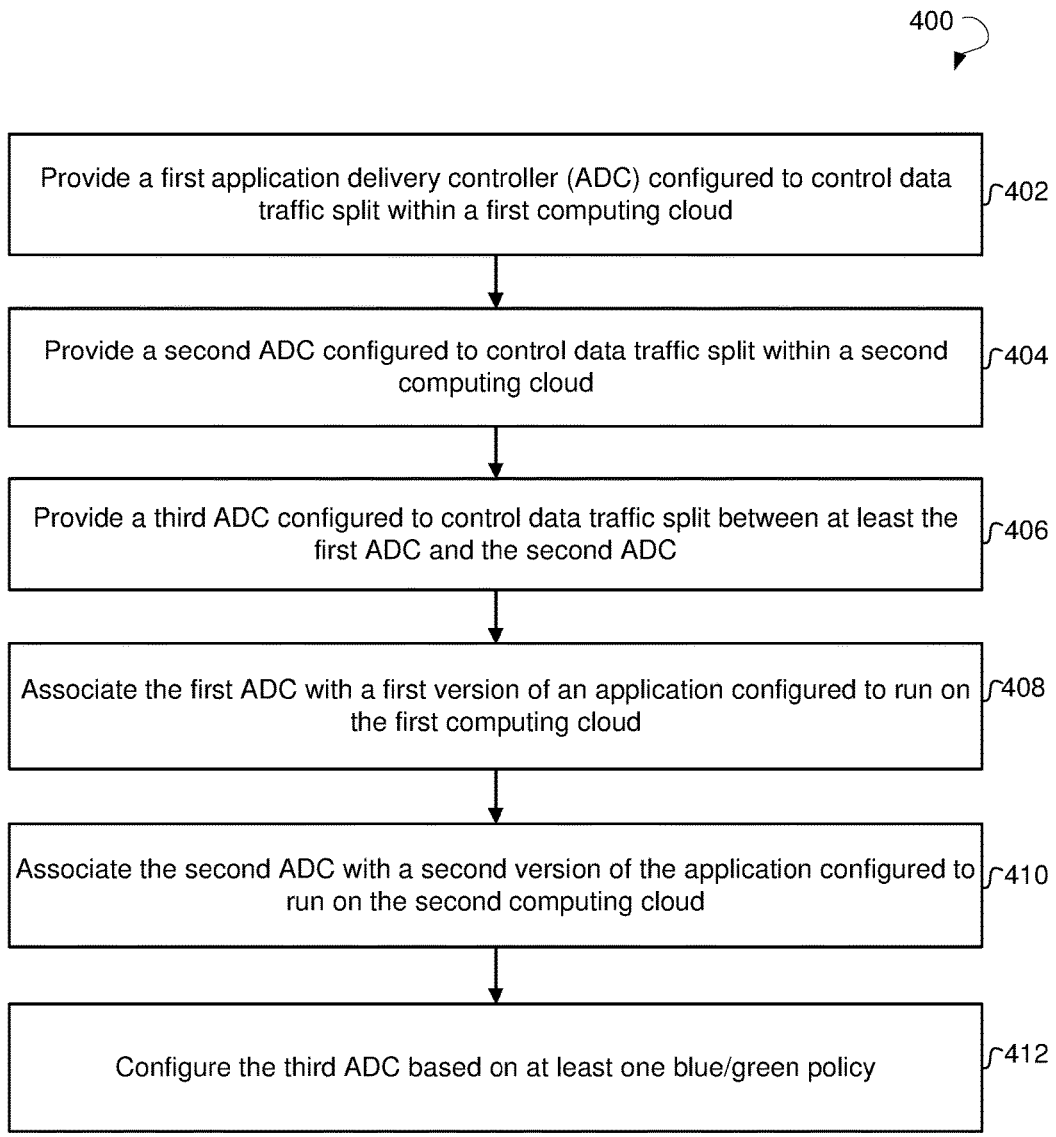
FIG. 4 shows a process flow diagram of a method for performing data traffic split across computing clouds, according to an example embodiment.

FIG. 4 shows a process flow diagram of a method 400 for inter-cloud traffic split, according to an example embodiment. In some embodiments, the operations of the method 400 may be combined, performed in parallel, or performed in a different order. The method 400 may also include additional or fewer operations than those illustrated. The method 400 may be performed by processing logic that may comprise hardware (e.g., decision making logic, dedicated logic, programmable logic, and microcode), software (such as software run on a general-purpose computer system or a dedicated machine), or a combination of both.

The method 400 may commence, in block 402, with providing a first ADC configured to control data traffic split within a first computing cloud.

In block 404, the method 400 may include providing a second ADC configured to control data traffic split within a second computing cloud. In some embodiments, the first computing cloud and the second computing cloud can be provided by different cloud providers.

In block 406, the method 400 may include providing a third ADC configured to control data traffic split between at least the first ADC and the second ADC.

In block 408, the method 400 may include associating the first ADC with a first version of an application configured to run on the first computing cloud.

In block 410, the method 400 may include associating the second ADC with a second version of the application configured to run on the second computing cloud.

In block 412, the method 400 may include configuring the third ADC based on at least one blue/green policy to deploy either the first version or the second version of the application.

Figure 5:
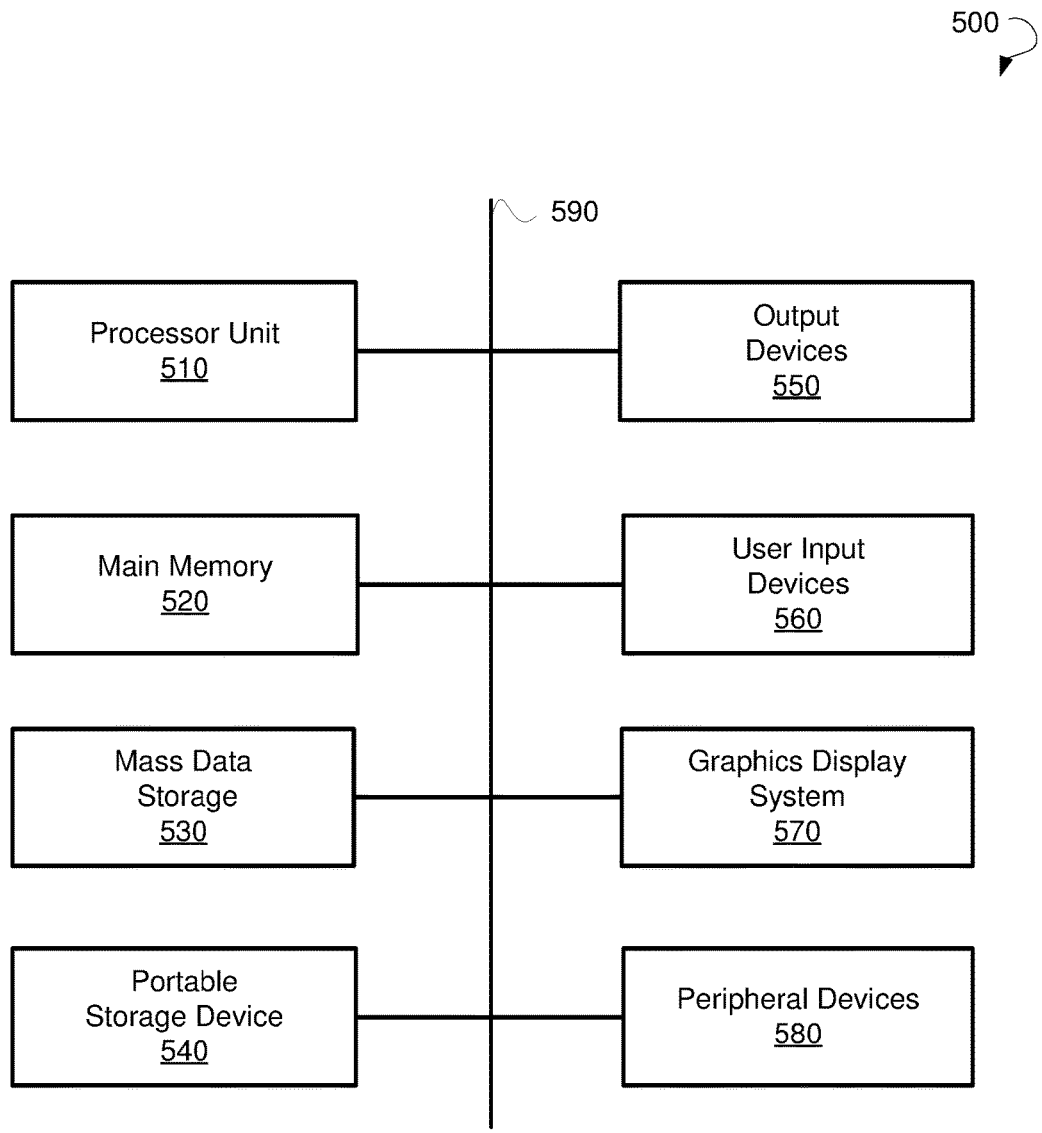
FIG. 5 shows a diagrammatic representation of a computing device for a machine, within which a set of instructions for causing the machine to perform any one or more of the methodologies discussed herein, can be executed.

FIG. 5 illustrates a computer system 500 that may be used to implement embodiments of the present disclosure, according to an example embodiment. The computer system 500 may serve as a computing device for a machine, within which a set of instructions for causing the machine to perform any one or more of the methodologies discussed herein can be executed. The computer system 500 can be implemented in the contexts of the likes of computing systems, networks, servers, or combinations thereof. The computer system 500 includes one or more processor units 510 and main memory 520. Main memory 520 stores, in part, instructions and data for execution by processor units 510. Main memory 520 stores the executable code when in operation. The computer system 500 further includes a mass data storage 530, a portable storage device 540, output devices 550, user input devices 560, a graphics display system 570, and peripheral devices 580. The methods may be implemented in software that is cloud-based.

The components shown in FIG. 5 are depicted as being connected via a single bus 590. The components may be connected through one or more data transport means. Processor units 510 and main memory 520 are connected via a local microprocessor bus, and mass data storage 530, peripheral devices 580, the portable storage device 540, and graphics display system 570 are connected via one or more I/O buses.

Mass data storage 530, which can be implemented with a magnetic disk drive, solid state drive, or an optical disk drive, is a non-volatile storage device for storing data and instructions for use by processor units 510. Mass data storage 530 stores the system software for implementing embodiments of the present disclosure for purposes of loading that software into main memory 520.

The portable storage device 540 operates in conjunction with a portable non-volatile storage medium, such as a floppy disk, a Compact Disk (CD), a Digital Versatile Disc (DVD), or USB storage device, to input and output data and code to and from the computer system 500. The system software for implementing embodiments of the present disclosure is stored on such a portable medium and input to the computer system 500 via the portable storage device 540.

User input devices 560 provide a portion of a user interface. User input devices 560 include one or more microphones, an alphanumeric keypad, such as a keyboard, for inputting alphanumeric and other information, or a pointing device, such as a mouse, a trackball, stylus, or cursor direction keys. User input devices 560 can also include a touchscreen. Additionally, the computer system 500 includes output devices 550. Suitable output devices include speakers, printers, network interfaces, and monitors.

Graphics display system 570 includes a liquid crystal display or other suitable display device. Graphics display system 570 receives textual and graphical information and processes the information for output to the display device. Peripheral devices 580 may include any type of computer support device to add additional functionality to the computer system.

The components provided in the computer system 500 of FIG. 5 are those typically found in computer systems that may be suitable for use with embodiments of the present disclosure and are intended to represent a broad category of such computer components that are well known in the art. Thus, the computer system 500 can be a PC, a handheld computing system, a telephone, a mobile computing system, a workstation, a tablet, a phablet, a mobile phone, a server, a minicomputer, a mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 500 may be implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 500, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for performing data traffic split between computing clouds have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for performing data traffic split across computing clouds, the system comprising:
  at least a first application delivery controller (ADC) and a second ADC, wherein:
    the first ADC is configured to control data traffic split within a first computing cloud, wherein the first computing cloud runs a first version of one or more applications; and
    the second ADC is configured to control data traffic split within a second computing cloud, wherein the second computing cloud runs a second version of the one or more applications; and
  a third ADC configured to control traffic split between at least the first ADC and the second ADC to control the traffic split between the first version of one or more applications and the second version of the one or more applications.

2. The system of claim 1, wherein the third ADC is further configured to control data traffic split based on at least one blue/green policy.

3. The system of claim 1, wherein the third ADC is further configured to control data traffic split based on at least one traffic split policy.

4. The system of claim 1, wherein the first computing cloud is provided by a first provider and the second computing cloud is provided by a second provider, the first provider differing from the second provider.

5. The system of claim 4, wherein at least one of the first computing cloud and the second computing cloud is provided by Google™, Amazon™, and Microsoft™.

6. The system of claim 1, wherein the first ADC is running on the first computing cloud and the second ADC is running on the second computing cloud.

7. The system of claim 1, wherein the third ADC is launched in response to determining that the first ADC is running and the second ADC is running.

8. The system of claim 1, wherein the third ADC is running on one of the first computing cloud or the second computing cloud.

9. The system of claim 1, further comprising an application delivery system configured to provide a user interface to configure the third ADC.

10. A method for performing data traffic split across computing clouds, the method comprising:
providing a first application deliver controller (ADC), the first ADC being configured to control data traffic split within a first computing cloud, wherein the first computing cloud runs a first version of one or more applications;
providing a second ADC, the second ADC being configured to control data traffic split within a second computing cloud, wherein the second computing cloud runs a second version of the one or more applications; and
providing a third ADC configured to control data traffic split between at least the first ADC and the second ADC to control the traffic split between the first version of one or more applications and the second version of the one or more applications.

11. The method of claim 10, further comprising configuring the third ADC based on at least one blue/green policy.

12. The method of claim 10, further comprising configuring the third ADC based on at least one traffic split policy.

13. The method of claim 10, wherein the first computing cloud is provided by a first provider and the second computing cloud is provided by a second provider, the first provider differing from the second provider.

14. The method of claim 13, wherein at least one of the first computing cloud and the second computing cloud is provided by Google™, Amazon™, and Microsoft™.

15. The method of claim 10, wherein the first ADC is running on the first computing cloud and the second ADC is running on the second computing cloud.

16. The method of claim 10, further comprising:
determining the first ADC is running and the second ADC is running; and
in response to the determination, launching the third ADC.

17. The method of claim 16, wherein the third ADC is running on one of the first computing cloud or the second computing cloud.

18. A system for performing data traffic split across computing clouds, the system comprising:
at least a first application delivery controller (ADC) and a second ADC, the first ADC being configured to control data traffic split within a first computing cloud provided by a first provider, wherein the first computing cloud runs a first version of one or more applications, the second ADC being configured to control data traffic split within a second computing cloud provided by a second provider, wherein the second computing cloud runs a second version of the one or more applications, with the first provider differing from the second provider, wherein:
the first ADC is associated with a first version of an application configured to run on the first computing cloud; and
the second ADC is associated with a second version of the application configured to run on the second computing cloud; and
a third ADC configured to control data traffic split between at least the first ADC and the second ADC to control the traffic split between the first version of one or more applications and the second version of the one or more applications based on at least one blue/green policy.

* * * * *